A. K. GILLESPIE.
METHOD OF FREEZING ICE CREAM.
APPLICATION FILED DEC. 27, 1920.
1,390,202.
Patented Sept. 6, 1921.
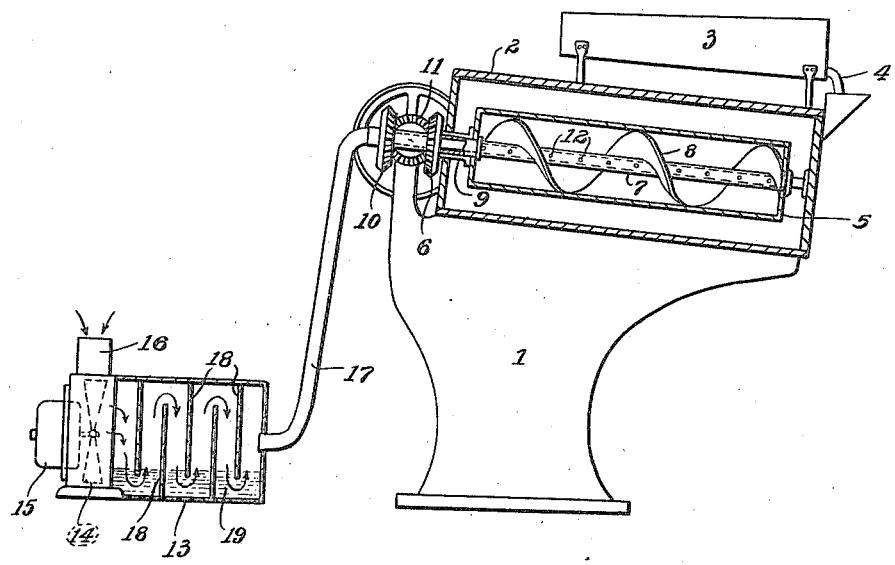
Inventor:
Alan K. Gillespie.
By Elliott Ammen
Attys.

UNITED STATES PATENT OFFICE.

ALAN K. GILLESPIE, OF RICHMOND HEIGHTS, MISSOURI.

METHOD OF FREEZING ICE-CREAM.

1,390,202.

Specification of Letters Patent.   Patented Sept. 6, 1921.

Application filed December 27, 1920.   Serial No. 433,537.

*To all whom it may concern:*

Be it known that I, ALAN K. GILLESPIE, a citizen of the United States, residing at Richmond Heights, St. Louis county, and State of Missouri, have invented new and useful Improvements in Methods of Freezing Ice-Cream, of which the following is a specification.

This invention relates to a novel method for use in producing ice cream relatively free from deleterious bacteria. The process consists generally in injecting into the freezer during the freezing operation, air which has been purified by washing and subsequently dehydrated. In the processes heretofore practised, it has been common to beat or agitate the cream and other ingredients, known as the "mix" in the presence of atmospheric air present in the freezer or container. As is well known, ice cream frozen under these conditions, will very materially increase in bulk. It has been proposed, in the interest of purity of product, to substitute carbonic acid gas in the freezer for the air therein, and such process is now being used. It is found, however, that, as in the case of air, the freezing mixture, or brine employed must be maintained above zero temperature, or otherwise the mix will congeal under the freezing operation before the air has been thoroughly mixed with the product.

It is a leading object of my invention, aside from obtaining a pure product, to greatly decrease the time employed in freezing the mix by proceeding in such a manner that a very low temperature of the refrigerant may be employed, say from 10 to 20 degrees below zero, with the result that the time of the freezing operation may be decreased anywhere from 50 to 60 per cent. and the capacity of a given freezer of the commercial type be proportionately increased. These results I obtain by forcing the air into the freezer under pressure and maintaining such pressure on the air during the freezing operation, whereby the incorporation of the air into the mix will be enormously facilitated and, as stated, a lower temperature of refrigerant may be employed. Heretofore, with the use of the ordinary refrigerant, and proceeding in the ordinary manner by simply not excluding the atmospheric air present in the freezer, from 10 to 15 minutes has been required to freeze a batch of 10 gallons and get the proper swell required commercially. In the practice of my invention, I have produced an equal swell of the mix and thorough freezing of the same in about from one-fourth to a little less than one-half the time ordinarily required. As will readily be seen, this will enable the manufacturer to increase his output by about 100% or even more with the same attendant cost.

In order that my improved process may be better understood, I have illustrated in the accompanying drawing, a form of apparatus for practising the same, the view being substantially a cross-section partly broken away, of a standard type of freezer provided with means for supplying purified air under pressure, to the container of the mix.

Referring to the drawing, numeral 1 indicates a base on which is supported a casing 2 for a refrigerant which is supplied from a container 3 through a spout 4. Suitably supported within the casing 2 to rotate therein, is a freezer 5, the bearing of said freezer at one end, projecting through the end of the casing 2 and being provided with a beveled gear 6. Mounted within the freezer 5 on a hollow shaft 7, is a scraper 8 in the form of a worm, the shaft of which extends through the bearing 9 of the freezer and through the beveled gear 6. A beveled gear 11 driven from any suitable source of power as shown, operates to rotate the scraper 8 and freezer 5 in opposite directions. The hollow shaft 7 is provided with perforations 12. Numeral 13 indicates a combined air purifying and dehydrating device provided on its interior with a fan 14 operated from a motor 15 which operates to draw any air through an inlet 16 and propel it from the casing of the device 13 to the pipe 17 which connects with the hollow shaft 7. Between the point of connection of the pipe 17 with the casing of the device 13 and the casing of the fan chamber 14, I provide a series of baffle plates or eliminators 18 which extend alternately in opposite directions from the top and bottom of the casing of device 13, those extending downwardly from the top of said device terminating just below the surface of a body of water 19 maintained in the bottom of the device 13. The air forced through the device 13 by the fan 14 will be thoroughly washed by being caused to pass through the body of water 19 and the moisture will be removed therefrom by means of the baffle plates 18. The fan 14 is run at such speed as to maintain the required degree of pressure so that the air will be forced out through the perforations 12 and operate to rapidly aerate the mix in the freezer 5. I may, of course, use a gas instead of air, but the latter is preferred for reasons of economy and ease of application. The term gas is therefore used generically in the claims to cover either.

It will be understood that neither the precise form of freezing machine shown, nor the exact form of purifier or dehydrator shown, is essential to my invention, but that any preferred types of these devices may be used without departing from the spirit of my invention.

It should be stated that the term "freezing" as herein employed refers to the production of a plastic, or semi-solid condition of the mix by partially freezing it only. In this condition the mix may readily be removed from the freezer. It is of course subsequently packed in containers and frozen to a more or less solid consistency.

I claim:—

1. The process of freezing a mix to make ice cream, which consists in agitating the mix during the freezing operation and coincident therewith continuously forcing through the body of the mix, and maintaining the same in contact with, gas under pressure, to expedite the thorough incorporation thereof in the mix and thereby reduce the time of the freezing operation.

2. The process of freezing a mix to make ice cream, which consists in agitating the mix during the freezing operation and coindent therewith continuously forcing purified air through the body of the mix and maintaining the latter during the freezing operation in contact with such air under pressure whereby to expedite the thorough incorporation of the air into the mix and to reduce the time of the freezing operation.

In testimony whereof I have hereunto set my hand.

ALAN K. GILLESPIE.